(12) United States Patent
Kumar

(10) Patent No.: US 7,319,757 B2
(45) Date of Patent: Jan. 15, 2008

(54) WIRELESS COMMUNICATION DEVICE AND METHOD FOR OVER-THE-AIR APPLICATION SERVICE

(75) Inventor: Anil K. Kumar, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 984 days.

(21) Appl. No.: 10/336,554

(22) Filed: Jan. 2, 2003

(65) Prior Publication Data

US 2004/0131185 A1  Jul. 8, 2004

(51) Int. Cl.
*H04K 1/00* (2006.01)
(52) U.S. Cl. .................... 380/247; 380/270; 713/168
(58) Field of Classification Search ......... 380/247, 380/270; 713/168; 717/173–174, 177–178; 726/2
See application file for complete search history.

(56) References Cited

U.S. PATENT DOCUMENTS 6,011,519 A * 1/2000 Sadler et al. ............... 343/742
6,711,400 B1 * 3/2004 Aura ........................... 455/411
2002/0032873 A1 * 3/2002 Lordemann et al. ........ 713/201

* cited by examiner

*Primary Examiner*—Kambiz Zand
*Assistant Examiner*—Peter Poltorak
(74) *Attorney, Agent, or Firm*—Schwegman, Lundberg & Woessner, P.A.

(57) ABSTRACT

A communication network provides over-the-air (OTA) applications and application services to wireless devices in a way that provides authentication and helps insure confidentiality and/or information integrity. An authentication center authenticates a wireless device by comparing a signed response from the device with a predicted signed response. The signed responses may be generated from a random number, the device's identification number and user key. When the wireless device is authenticated, the OTA application may be sent to the wireless device in protocol data units (PDUs). Prior to sending the PDUs, a random number may be added to one of the PDUs. When receiving the PDUs, the device may extract the random number and calculate a cipher key using the number and a user key. The OTA application may be accepted when the calculated cipher key matches a prior generated cipher key.

22 Claims, 5 Drawing Sheets

AUTHENTICATION

WIRELESS COMMUNICATION DEVICE AND METHOD FOR OVER-THE-AIR APPLICATION SERVICE

TECHNICAL FIELD

The present invention pertains to wireless communications and packet based mobile terminals.

BACKGROUND

Next generation wireless devices may look and function more like application platforms (e.g., personal computers) instead of the closed systems that are more prevalent today. With the introduction of 2.5 G and 3 G networks as well as other packet based multi-service wireless networks, applications can be downloaded over the air (OTA) and executed on these wireless devices. Accordingly, service provider and network administrators may be able to upgrade a device's software or provide the device with new software applications.

One problem with these multi-service wireless networks is that it is difficult for service providers to maintain the integrity of applications provided over the air while also authenticating the device and assuring confidentiality of the application. Thus, what is needed are an improved wireless device and method for OTA application service. What is also needed is a wireless device and method for OTA application service that provides authentication and helps assure confidentiality and data integrity.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
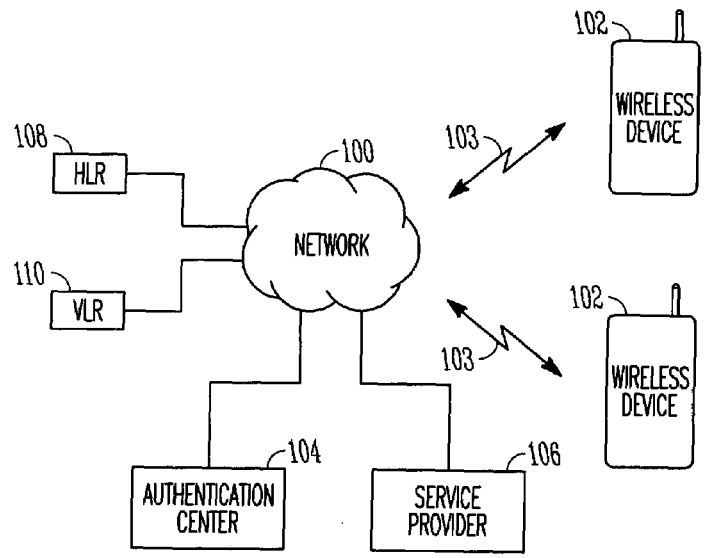
FIG. 1 illustrates an operational environment of a wireless network in accordance with an embodiment of the present invention.

FIG. 1 illustrates an operational environment of a wireless network in accordance with an embodiment of the present invention. Network 100 may provide over-the-air (OTA) applications and application services to wireless devices 102 in a way that provides authentication and helps insure confidentiality, and/or information integrity. Examples of OTA applications and application services may include a computer program, a game program, data, a video (e.g., a movie), music, a program for programming the wireless device, or a location-based service. In one example, OTA applications include software upgrades for the device. In accordance with an embodiment, authentication center 104 may authenticate a wireless device requesting an OTA application by comparing a calculated signed response (Sresc) from the wireless device with a predetermined or predicted signed response. The signed response may be generated from a random number provided by the network, the device's identification number (e.g., an international mobile subscriber identity (IMSI) number) and a user key (Ki). When the wireless device is authenticated, an OTA application may be sent to the wireless device in encrypted protocol data units (PDUs). The random number may be added to one of the PDUs prior to encryption. The wireless device may decrypt the received PDUs, and may extract the random number from the one PDU. The encryption/decryption helps ensure confidentiality of the OTA application. The wireless device may also calculate a cipher key (Kcc) from the extracted random number and a user key (Ki) stored within the wireless device. The wireless device may either accept or reject the OTA application based on a comparison between the calculated cipher key (Kcc) and a prior generated cipher key (Kc) that may have been used for decryption. The comparison between the keys helps ensure data integrity while providing another layer of authentication.

Wireless communication devices 102 may communicate over wireless links 103 with communication network 100. Devices 102 may be any form of wireless or mobile communication devices or systems including mobile data terminals, wireless or cellular telecommunication devices, including 2.5 G and 3 G communication devices, and portable or stationary computers with wireless communication capability. Devices 102 may also include, for example, personal digital assistants (PDAs) and Web tablets. Devices 102 may access data networks such as an intranet, the Internet or another data network through network 100. Devices 102 may also be suitable to receive OTA application services which include data services including the receipt of receive streaming video and/or audio through network 100. In one embodiment, wireless device 102 may comprise one or more semiconductor devices.

Devices 102 may communicate through network 100 and may access other communication systems such as public switched telephone network (PSTN) through wireless communication network 100. Devices 102 may include functionality for communicating various information content types over wireless links 103 and implementing one or more communication techniques with communication network 100.

Communication techniques that devices 102 may implement may include digital and/or analog wireless communication techniques such as code division multiple access (CDMA) techniques, wideband CDMA techniques, frequency division multiple access (FDMA) techniques, and/or time-division multiple access (TDMA) techniques. Devices 102 may also be able to communicate in accordance with various communication standards and protocols as required by network 100. Network 100 may be almost any type of network including a public land mobile network (PLMN). Devices 102 may implement standards such as the Pan-European mobile system standard referred to as the Global System for Mobile Communications (GSM). Devices 102 may also operate in accordance with packet radio services such as the General Packet Radio Service (GPRS) packet data communication service. In other embodiments, network 100 may provide for communications with devices 102 in accordance with the Universal Mobile Telephone System (UMTS) for the next generation of GSM, which may, for example, implement communication techniques in accordance with 2.5 G and 3 G wireless standards (See 3 GPP Technical Specification, Version 3.2.0, March 2000). In this embodiment, network 100 may provide packet data services (PDS) utilizing packet data protocols (PDP). Network 100 may include base stations (not specifically illustrated) for supporting communication links 103 as well as other supporting elements for facilitating communications with many wireless communication devices. Embodiments of the present invention may also be suitable for operation over many other air-interfaces including interfaces compatible with the enhanced data for GSM evolution (EDGE) standards (see 3 GPP Technical Specification, Version 3.2.0, March 2000).

In addition to operations described herein, authentication center 104 may also perform operations conventionally performed by an authentication center for a communication network. Home location register (HLR) 108 may store subscriber identity information including information used to authenticate wireless devices 102. Visitor location register (VLR) 110 may store similar information for subscribers when roaming outside their home coverage area. In accordance with embodiments of the present invention, HLR 108 and VLR 110 may store, among other things, a device identification number and a user key (Ki) for each of devices 102 that may access network 100. The device identification number may, for example, be a phone number or international mobile subscriber identity (IMSI) number. In these embodiments, authentication center 104 may generate a triplet for a particular one of wireless devices 102 and may store the triplet in HLR 108 and VLR 110. The triplet may include a generated random number, a cipher key (Kc) and a predicted signed response (Sres). The random number may be generated by the authentication center when authentication is performed. The cipher key (Kc) may be generated using the random number and the user key (Ki). The predicted signed response (Sres) may be generated using the random number, user key (Ki) and device identification number. Various conventional algorithms are suitable for generating random numbers, signed responses and cipher keys.

In one embodiment of the present invention, devices 102 may receive location-based OTA services from service providers 106. In this embodiment, a location server (not illustrated) may provide a device's current location information to service providers 106. Service providers 106 may provide location based advertising particular to the device's location. For example, if a device is currently located near a shopping center, service providers may issue the user of a device a coupon for a store or restaurant at the shopping center, or provide advertising for a particular merchant at the shopping center. Location based OTA services may also include emergency services such as emergency 911 service in which a location server may provide current location information for ambulance, police or fire services.

In accordance with embodiments of the present invention, the response generation process authenticates a wireless device to help assure the claimed device is the correct device. Data encryption helps assure confidentiality to prevent disclosure of an OTA application or other sensitive data. A key matching process helps assure data integrity to prevent the data from being modified.

Figure 2:
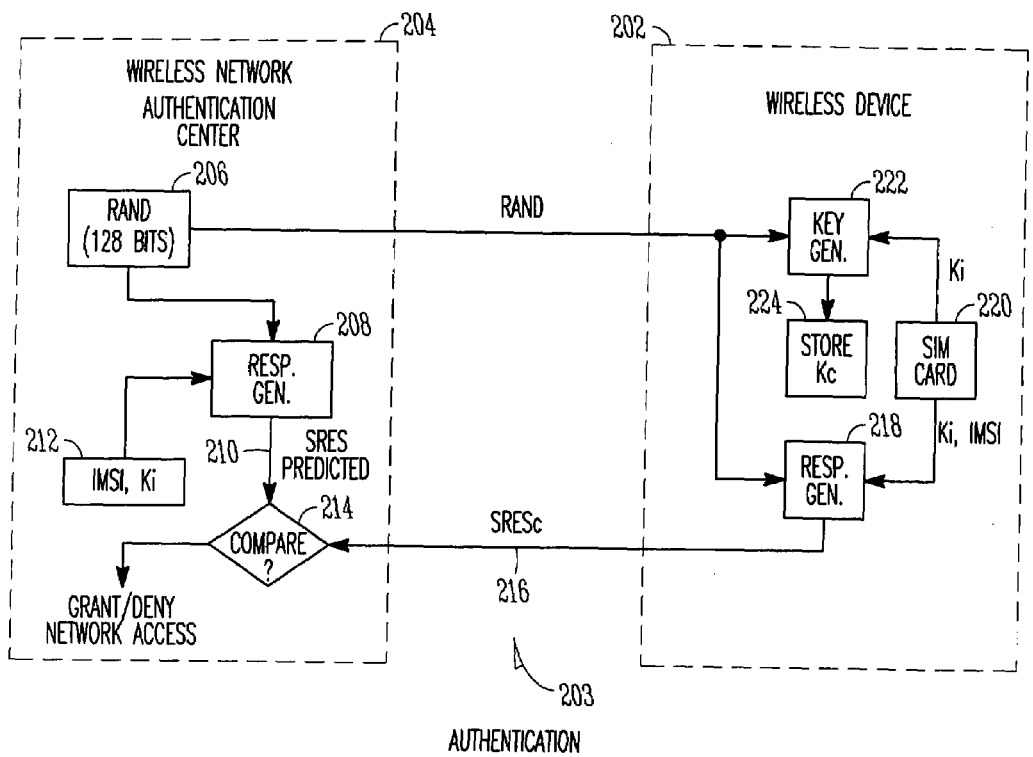
FIG. 2 is a block diagram illustrating authentication of a wireless device in accordance with an embodiment of the present invention.

FIG. 2 is a block diagram illustrating authentication of a wireless device in accordance with an embodiment of the present invention. Wireless device 202 may be suitable for use a one of devices 102 (FIG. 1) and authentication center 204 may be suitable for use as authentication center 104 (FIG. 1), although other device and elements may also be suitable. In accordance with embodiments of the present invention, authentication center 204 authenticates device 202 by sending device 202 a random number over wireless link 203 and comparing a signed response (Sres) received from device 202 with predicted signed response 210. The random number, the cipher key and signed response may comprise a triplet generated by authentication center 204.

The random number may be generated by random number generator 206, and may be generated by any conventional technique. The random number may be any length, which may depend on the ciphering algorithms used. In one embodiment, the random number may be a 128-bit number, however 256-bit and larger numbers may also be used.

Predicted signed response 210 may be generated by a ciphering algorithm, which may be performed by element 208 using a user key (Ki) and a device identification number. Element 208 may implement an authentication algorithm such as the A3 algorithm although other algorithms may also be suitable. The user key (Ki) and the device identification number (e.g., the IMSI) may be retrieved from storage location 212, which may be from a HLR or VLR. Predicted signed response 210 includes a value digitally signed with user key (Ki). Predicted signed response 210 is compared with signed response 216 received from wireless device 202 over wireless link 203. Element 208 may comprise hardware and/or software elements, such as logic and processors to perform the ciphering algorithm.

Element 218 of wireless device 202 may generate signed response 216 with user key (Ki), the device identification number, and the random number received from authentication center 204. Element 218 may implement an authentication algorithm such as the A3 algorithm although other algorithms may also be suitable. The user key (Ki) and the device identification number may be stored within memory of the wireless device, or may be securely located on a subscriber information module (SIM) 220 which may be inserted into the device. In addition, element 222 may generate a cipher key (Kc) using the received random number and user key (Ki) by performing a ciphering algorithm. The generated cipher key (Kc) may be securely stored in memory 224. In one embodiment, element 222 may implement a ciphering algorithm, such as the A8 algorithm, although other algorithms may also be suitable. Elements 218 and 222 may comprise hardware and/or software elements, such as logic and processors to perform ciphering algorithms. Examples of authentication and ciphering algorithms (e.g., A3, A5 and A8) discussed herein may be found in various 2.5 G and 3 G packet based network specifications referenced above.

In accordance with embodiments of the present invention, when element 218 of wireless device implements the same authentication algorithm as element 208 of authentication center 204 using the same user key (Ki) and device identification number, signed response 216 should match predicted signed response 210. This may authenticate the wireless device.

Wireless device 202 may include processors, memory, I/O, firmware, software, a transceiver, and other conventional elements to perform the various operations described herein. Similarly, authentication center 204 may include processors, memory, I/O, firmware, software, and other conventional elements to perform the various operations described herein. Authentication center 204 may be coupled to base station transceivers for communicating with wireless devices over wireless communication link 203.

Although device 202 and authentication center 204 are illustrated as having several separate functional elements, one or more of the functional elements may be combined and may be implemented by combinations of software configured elements, such as processing elements including digital signal processors (DSPs), and/or other hardware elements. For example, processing elements may comprise one or more microprocessors, DSPs, PLAs, ASICs, and combinations of various hardware and logic circuitry for at least performing the functions described herein. In embodiments, device 202 may include an antenna, a receiver, a transmitter, and a processing element to perform the operations and functions described herein. The antenna may be a dipole antenna, a monopole antenna, a loop antenna, a microstrip antenna or other type of antenna suitable for reception and/or transmission of RF signals.

Figure 3:
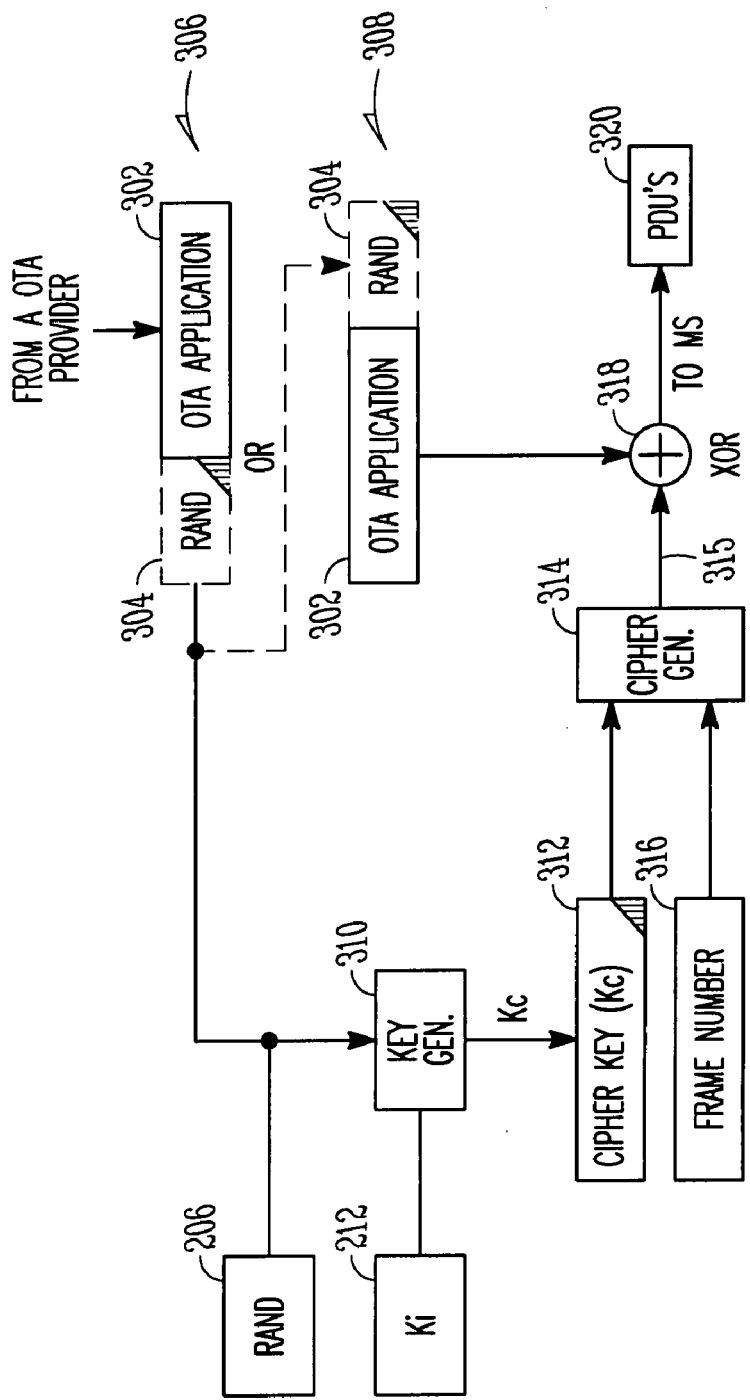
FIG. 3 is a block diagram illustrating network operations in accordance with an embodiment of the present invention.

FIG. 3 is a block diagram illustrating network operations in accordance with an embodiment of the present invention. The operations illustrated in FIG. 3 may be performed by an authentication center, such as authentication center 204 (FIG. 2), and may be performed after a wireless device to receive an OTA application service has been authenticated. The authentication center may receive the OTA application 302 from an application service provider, such as provider 106 (FIG. 1). A plurality of PDUs may be generated which contain OTA application 302. Random number 304 may be added to one of the PDUs of the OTA application 302, and in one embodiment, may be added to the executable code of the OTA application 302. In one embodiment, which is identified by reference designation number 306, random number 304 is added as a preamble to a particular one of the PDUs. In another embodiment, which is identified by reference designation number 308, random number 302 may be added as a post-amble to a particular one of the PDUs. Random number 304 may be the same random number that is part of the triplet, although this is not a requirement.

Element 310 may generate cipher key (Kc) 312 using the random number generated by random number generator 206 and user key (Ki) from storage location 212 by performing a ciphering algorithm. In one embodiment, element 310 may implement a ciphering algorithm, such as the A8 algorithm, although other algorithms may also be suitable. Cipher key (Kc) may be part of the triplet previously generated for the device and stored in a register. Element 314 may generate a stream cipher based on frame number 316 and cipher key 312. The stream cipher may be exclusive-OR'ed (XOR'ed) with the PDUs on a frame-by-frame basis by XOR element 318 to provide encrypted PDUs 320. Encrypted PDUs 320 may be sent to the receiving wireless device over the network. In one embodiment, element 314 may perform a stream cipher algorithm, such as the A5 algorithm, although other algorithms may also be suitable. In this embodiment, element 314 may, for example, utilize three linear feedback shift registers (LFSRs) having different lengths and implementing feedback polynomials, which are XOR'ed together to generate cipher output 315. Elements 310 and 314 may comprise hardware and/or software elements, such as logic and processors to perform a particular ciphering algorithm. In one embodiment, cipher key (Kc) 312 may be viewed as session key. In one embodiment, a base station may perform an encryption of time division multiplexed (TDM) frames using the Kc.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Figure 4:
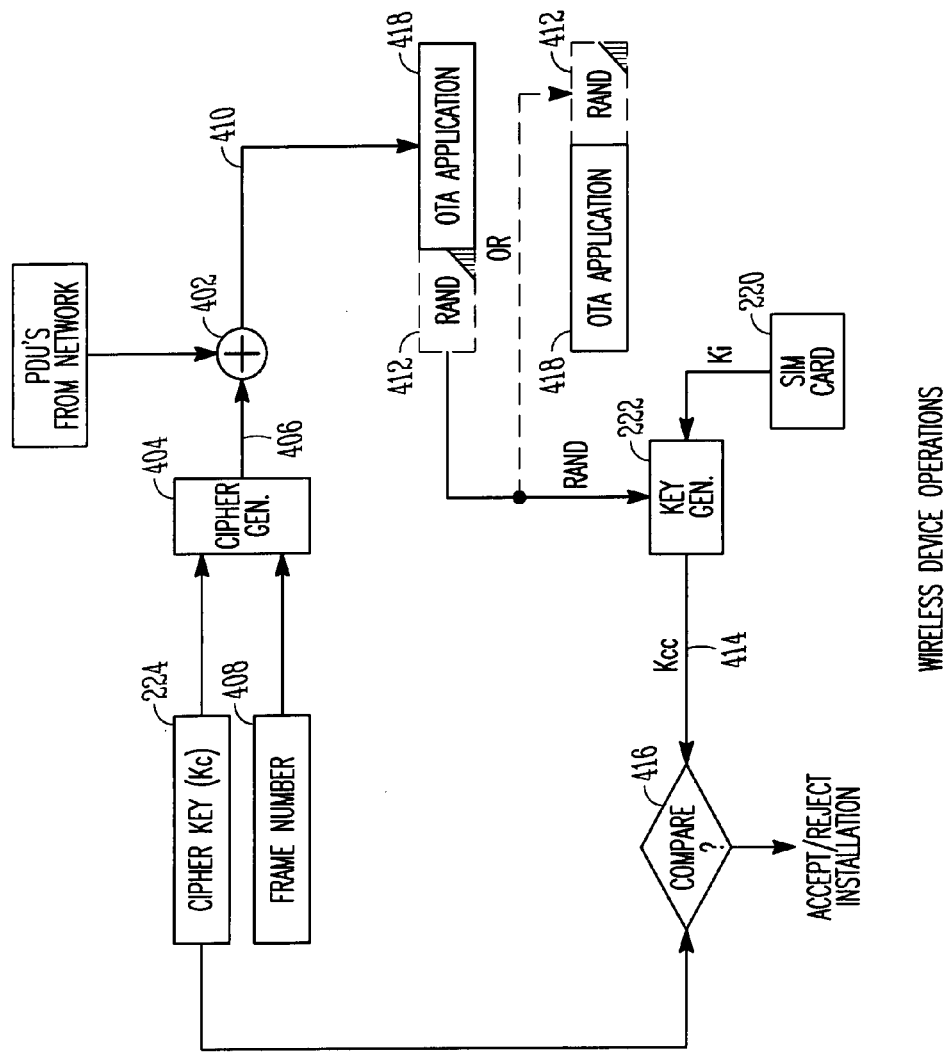
FIG. 4 is a block diagram illustrating wireless device operations in accordance with an embodiment of the present invention.

FIG. 4 is a block diagram illustrating wireless device operations in accordance with an embodiment of the present invention. The operations illustrated in FIG. 4 may be performed by a wireless device, such as wireless device 202 (FIG. 2), and may be performed after the wireless device has been authenticated by an authentication center. PDUs 320 are received by the wireless device and XOR'ed with cipher 406 generated by element 404. Element 404 may use previously generated cipher key (Kc) from storage element 224 (FIG. 2) and frame number 408 to generate a stream cipher. In one embodiment, element 404 may implement a ciphering algorithm, such as the A5 algorithm, although other algorithms may also be suitable.

The wireless device may extract random number 412 from one of decrypted PDUs 410, and element 222 may calculate cipher key (Kcc) 414 from the extracted random number and the user key (Ki) from SIM 220. Comparison element 416 may compare calculated cipher key (Kcc) 414 with prior generated cipher key (Kc) from storage 224. The wireless device may either accept or reject the OTA application 418 based on the comparison of the prior generated cipher key (Kc) and the calculated cipher key (Kcc). If accepted, the OTA application may be extracted from the frames of PDUs, and the OTA application loaded and/or executed by the device. If rejected, the OTA application may not be able to be utilized by the wireless device, and may be discarded.

Figure 5:
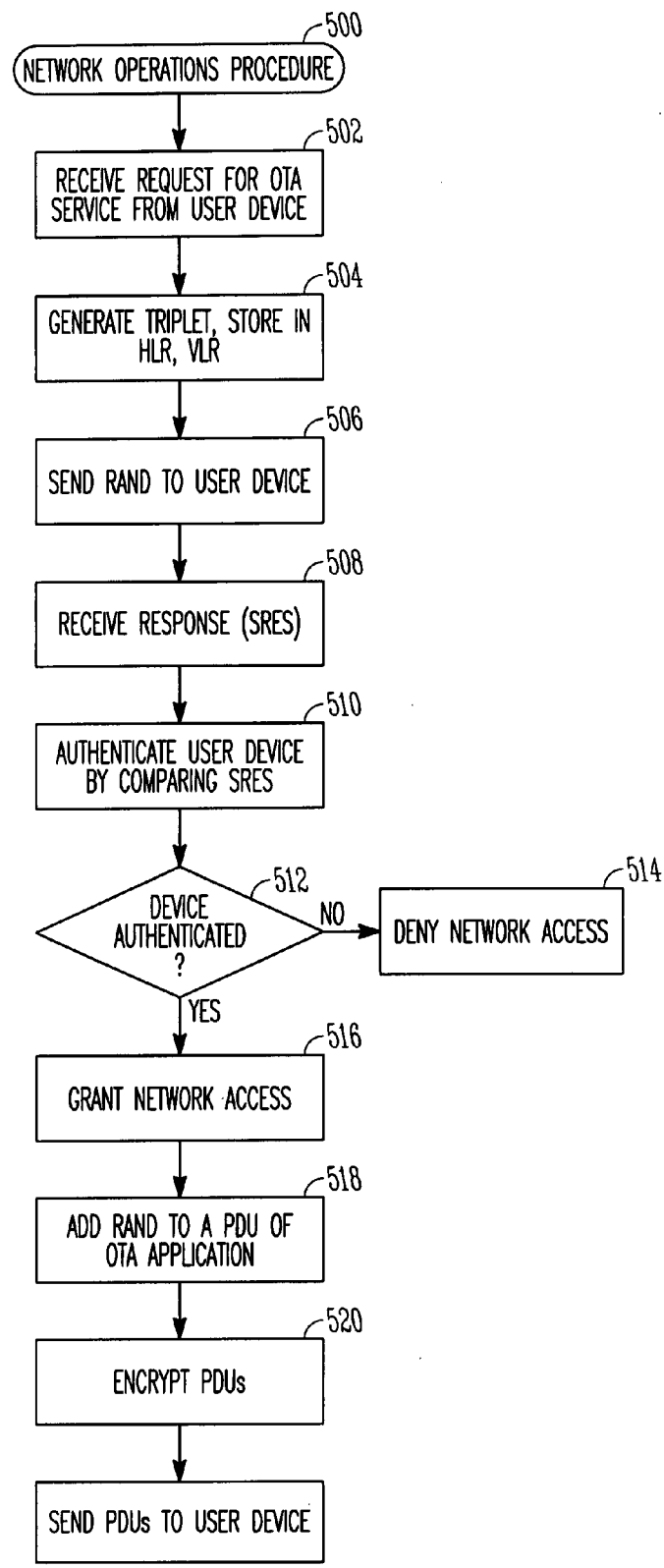
FIG. 5 is a flow chart of a network operations procedure in accordance with an embodiment of the present invention.

FIG. 5 is a flow chart of a network operations procedure in accordance with an embodiment of the present invention. Procedure 500 may be performed by an authentication center, such as authentication center 204 (FIG. 2) and other network elements to authenticate a wireless device and provide the wireless device with an OTA application, although other elements and devices may also be suitable. In operation 502, a request for an OTA application or application service may be received at an authentication center. In one embodiment, no request need be received and the network may decide that a wireless device should be provided an OTA application.

In operation 504, a triplet for the wireless device may be generated. The triplet may be unique to the wireless device and may comprise a random generated number, a cipher key (Kc) and a predicted signed response (Sres). Operation 504 may include storing the triplet in a HLR and VLR. Operation 504 may, for example, be performed by elements 206 and 208 (FIG. 2), and element 310 (FIG. 3).

In operation 506, the random number may be sent to the wireless device over a wireless link, and a signed response may be received from the wireless device in operation 508. In operation 510, the signed response may be compared with a signed response generated using the triplet from operation 504. When the responses match, the wireless device is authenticated in operation 512. When the responses do not match, the wireless device may be denied access in operation 514.

When the responses match, network access may be granted to the device in operation 516 allowing the authentication center to send the OTA application to the device. In operation 518, the authentication center may provide the OTA application in PDUs and may add a random number to one of the PDUs as previously discussed. The PDUs may be encrypted in operation 520 and transmitted to the wireless device over the wireless link in operation 522.

Although the individual operations of procedure 500 are illustrated and described as separate operations, one or more of the individual operations may be performed concurrently and nothing requires that the operations be performed in the order illustrated.

Figure 6:
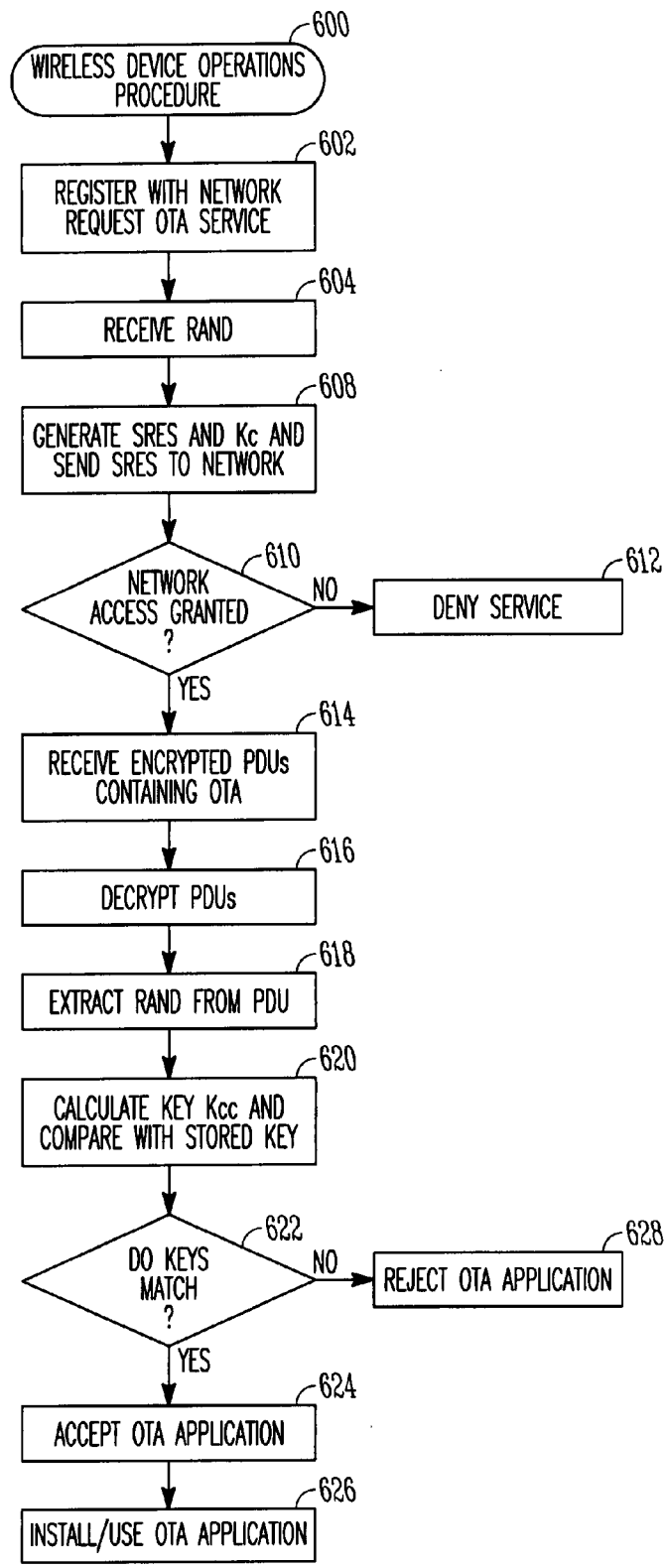
FIG. 6 is a flow chart of a wireless device operations procedure in accordance with an embodiment of the present invention.

FIG. 6 is a flow chart of a wireless device operations procedure in accordance with an embodiment of the present invention. Procedure 600 may be performed by a wireless communication device, such as device 202 (FIG. 2), although other devices may also be suitable. In operation 602, a wireless communication device may send a registration request or a request for an OTA application to a communication network. The request may include an identification number of the wireless device, such as the telephone number or IMSI number. In operation 604, the wireless device may receive a random number and in operation 606, the wireless device may generate a signed response (e.g. Sres) using the random number, a user key (Ki) and its identification number. The signed response may be sent over a wireless link to the network and an authentication center may use the signed response to authenticate the wireless device in operation 610 to grant or deny network access or service. Portions of procedure 600 may be suitable for authentication and may be performed by an authentication center. When the device is not authenticated, network access or service is denied in operation 608. When the device is authenticated, operation 614 is performed in which the device may receive encrypted PDUs that contain the OTA application. One of the PDUs may contain a random number. The PDUs may be decrypted in operation 616 using a cipher key (Kc) previously generated with the random number received in operation 604.

In operation 618, the random number may be extracted from the one PDU, and in operation 620, a cipher key (Kcc) may be calculated using the extracted random number and user key (Ki). The calculated key (Kcc) may be compared with the prior generated cipher key (Kc). In operation 622, when the keys match, operation 624 is performed in which the OTA application may be accepted. In operation 626, the OTA application may be executed and/or utilized by the device. When the keys do not match, the OTA application may be rejected in operation 628 and not installed or utilized by the wireless device. In one embodiment, software and/or hardware operating on the wireless device may help ensure that the OTA application is not accepted when the keys fail to match in operation 622.

Although the individual operations of procedure 600 are illustrated and described as separate operations, one or more of the individual operations may be performed concurrently and nothing requires that the operations be performed in the order illustrated.

Thus, an improved wireless device and method for OTA application service has been described. A signed response generation process authenticates a wireless device to help assure the claimed device is the correct device. Data encryption helps assure confidentiality to prevent disclosure of an OTA application or other sensitive data. A key matching process helps assure data integrity to prevent the data from being modified. Embodiments of the present invention also include a semiconductor devices, and articles comprising storage mediums (such as computer discs, memory or CDs) with instructions stored thereon executable by computing platforms.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method of providing an over-the-air (OTA) application to a wireless device comprising:
   receiving a request for an OTA application at an authentication center from the wireless device;
   generating a random number and sending the random number to the wireless device in response to the request;
   receiving a signed response (Sres) from the wireless device, the signed response generated by the wireless device based on the random number and a user key (Ki) stored within the wireless device; and
   authenticating the wireless device by comparing the signed response (Sres) received from the wireless device with a predicted signed response (Sres),
   when the wireless device is authenticated, the method further comprises:
   adding the random number to one protocol data unit (PDU) of a plurality of PDUs comprising the OTA application;
   encrypting the PDUs using a cipher key (Kc) generated with the random number; and
   sending the encrypted PDUs to the wireless device,
   wherein the wireless device extracts the random number from the one PDU that includes the random number, calculates a calculated cipher key (Kcc) from the extracted random number and the user key (Ki), and either accepts or rejects installation of the OTA application based on a comparison of the calculated cipher key (Kcc) and a generated cipher key (Kc).

2. The method of claim 1 wherein the authentication center generates the predicted signed response using the random number, a device identification (ID) number, and the user key (Ki).

3. The method of claim 1 wherein prior to authenticating, the random number is used by the wireless device requesting the OTA application to generate the generated signed response.

4. The method of claim 2 further comprising storing a triplet in a home location register (HLR) and visitor location register (VLR), the triplet comprising the random number, the cipher key (Kc) and the predicted signed response,
   wherein at the authentication center, the method further comprising generating the cipher key (Kc) from the user key (Ki) and the random number, wherein the predicted signed response is generated at the authentication center from the user key and the device identification number.

5. The method of claim 1 wherein the user key is stored on a subscriber information module (SIM) inserted into the wireless device,
   and wherein the predicted signed response matches the device-generated signed response from the wireless device when both the wireless device and an authentication center use the same user key (Ki) and the same random number to generate the signed response.

6. The method of claim 1 further comprising, prior to encrypting, generating the cipher key (Kc) using the random number and the user key (Ki) associated with the wireless device.

7. The method of claim 1 further comprising generating a transport layer PDU for the one PDU, and transmitting executable code of the OTA within the plurality of PDUs.

8. The method of claim 1 wherein the OTA application is provided by a service provider, and wherein the random number is added as a preamble to the one PDU, and
   wherein the OTA application is one of either a computer program, a game program, data, a video, music or a program for programming the wireless device, and wherein the video or music or other content are provided by a content provider.

9. The method of claim 1 wherein encrypting includes encrypting the plurality of PDUs including the one PDU that includes the random number.

10. A method of receiving an over-the-air (OTA) application by a wireless device comprising:
   receiving a random number from an authentication center in response to a request for an over-the-air (OTA) application;
   sending a signed response (Sres) to the authentication center, the signed response generated based on the received random number and a user key (Ki) stored within the wireless device;
   generating a generated cipher key (Kc) from the received random number and the user key (Ki);
   when authenticated, receiving a plurality of encrypted protocol data units (PDUs) that include the OTA application, one of the encrypted PDUs including the random number;
   extracting the random number from the one PDU;
   calculating a calculated cipher key (Kcc) from the extracted random number and the user key (Ki); and
   either accepting or rejecting installation of the OTA application based on a comparison of the calculated cipher key (Kcc) and the generated cipher key (Kc),
   wherein a processing element within the wireless device generates the signed response, generates the generated cipher key, extracts the random number, calculates the calculated cipher key and either accepts or rejects the installation.

11. The method of claim 10 further comprising decrypting the received PDUs that include the OTA application with the generated cipher key (Kc).

12. The method of claim 11 wherein the authentication center authenticates the wireless device by generating the random number, sending the random number to the wireless device, and comparing a predicted signed response with the signed response received from the wireless device,
   wherein the authentication center generates the predicted signed response from the random number, the user key (Ki) and a device identification number associated with the wireless device.

13. The method of claim 12 wherein the authentication center generates a cipher key (Kc) corresponding to the generated cipher key (Kc) from the random number and the user key (Ki).

14. The method of claim 13 wherein the authentication center:
   encrypts the PDUs that include the OTA application with the generated cipher key (Kc); and
   sends the encrypted PDUs to the wireless device when authenticated.

15. The method of claim 1 further comprising:
   generating the signed response using the received random number and the user key (Ki), the user key being stored within a subscriber information module (SIM) inserted into the wireless device; and
   generating the cipher key (Kc) from the received random number and the stored user key (Ki); and
   decrypting the received PDUs that include the OTA application with the generated cipher key (Kc).

16. The method of claim 15 wherein the OTA application comprises one of a computer program, a game program, data, a video, music or a program for programming the wireless device.

17. A wireless communication device comprising:
   a receiver to receive a random number from an authentication center in response to a request for an over-the-air (OTA) application;
   a transmitter to transmit a signed response to the authentication center, the signed response generated based on the received random number and a user key (Ki) stored within the wireless communication device; and
   a processing element to generate the signed response,
   wherein when authenticated, the receiver receives a plurality of encrypted protocol data units (PDUs) that include the OTA application, one of the encrypted PDUs including the random number, the processing element extracts the random number from the one PDU and calculates a calculated cipher key (Kcc) from the extracted random number and the user key (Ki), the processing element either accepts or rejects installation of the OTA application based on a comparison of the calculated cipher key (Kcc) and a generated cipher key (Kc),
   wherein the processing element generates the generated cipher key (Kc) from the received random number and the user key (Ki).

18. The device of claim 17 wherein the processing element decrypts the received PDUs that include the OTA application with the generated cipher key,
   and wherein the device further comprises a subscriber information module (SIM) receptacle for insertion of a SIM, the SIM to store the user key (Ki).

19. The device of claim 18 wherein the processing element generates the signed response using the received random number, the user key, and a device identification stored on the SIM.

20. A semiconductor device comprising:
   a processing element to generate a signed response based on a random number and a user key (Ki), and to generate a generated cipher key (Kc) from the random number and the user key (Ki); and memory to store the generated cipher key (Kc) and instructions for execution by the processing element, wherein the random number is received from an authentication center in response to a request for an over-the-air (OTA) application and the signed response is sent to the authentication center, wherein in response to the request and when authenticated by the authentication center, a plurality of encrypted protocol data units (PDUs) is received that include the OTA application, one of the encrypted PDUs including the random number, wherein the processing element extracts the random number from the one encrypted PDU calculates a calculated cipher key (Kcc) from the extracted random number and the user key (Ki), and either accepts or rejects installation of the OTA application based on a comparison of the calculated cipher key (Kcc) and the generated cipher key (Kc).

21. The device of claim 20 wherein the processing element decrypts the received PDUs that include the OTA application with the generated cipher key.

22. The device of claim 21 wherein the processing element generates the signed response using the received random number, the user key, and a wireless device identification number.

* * * * *

UNITED STATES PATENT AND TRADEMARK OFFICE
CERTIFICATE OF CORRECTION

PATENT NO. : 7,319,757 B2 Page 1 of 1
APPLICATION NO. : 10/336554
DATED : January 15, 2008
INVENTOR(S) : Kumar It is certified that error appears in the above-identified patent and that said Letters Patent is hereby corrected as shown below:

In column 10, line 17, in Claim 15, delete "claim 1" and insert -- claim 11 --, therefor.

In column 11, line 13, in Claim 20, after "PDU" insert -- , --.

Signed and Sealed this

Twenty-ninth Day of April, 2008

JON W. DUDAS
*Director of the United States Patent and Trademark Office*